US012160718B2

(12) United States Patent
Lai

(10) Patent No.: US 12,160,718 B2
(45) Date of Patent: Dec. 3, 2024

(54) MOVING COIL SPEAKER WITH ANNULAR RIB

(71) Applicant: Merry Electronics (Shenzhen) Co., Ltd., ShenZhen (CN)

(72) Inventor: Tsai Ti Lai, Taichung (TW)

(73) Assignee: Merry Electronics (Shenzhen) Co., Ltd., ShenZhen (CN)

( * ) Notice: Subject to any disclaimer, the term of this patent is extended or adjusted under 35 U.S.C. 154(b) by 197 days.

(21) Appl. No.: 17/875,423

(22) Filed: Jul. 28, 2022

(65) Prior Publication Data

US 2024/0015444 A1 Jan. 11, 2024

(30) Foreign Application Priority Data

Jul. 8, 2022 (TW) .................................. 111125805

(51) Int. Cl.
*H04R 9/04* (2006.01)
*H04R 1/06* (2006.01)
*H04R 9/02* (2006.01)
*H04R 9/06* (2006.01)

(52) U.S. Cl.
CPC ............... *H04R 9/025* (2013.01); *H04R 1/06* (2013.01); *H04R 9/06* (2013.01); *H04R 2400/11* (2013.01)

(58) Field of Classification Search
CPC . H04R 9/00; H04R 9/02; H04R 9/025; H04R 9/04; H04R 2209/024; H04R 2400/11
USPC ................................ 381/396, 400, 412, 420
See application file for complete search history.

(56) References Cited

U.S. PATENT DOCUMENTS 6,385,328 B1 * 5/2002 Yoo .......................... H04R 1/06 381/409
2002/0044671 A1 * 4/2002 Shimomura ............. H04R 9/06 381/386
2002/0094107 A1 * 7/2002 Cork ....................... H04R 9/025 381/396
2005/0244028 A1 * 11/2005 Klein ....................... H04R 9/00 381/396
2008/0192976 A1 * 8/2008 Kim ......................... H04R 9/06 381/412
2015/0078612 A1 * 3/2015 Yang ........................ H04R 9/04 381/414

* cited by examiner

*Primary Examiner* — Katherine A Faley
(74) *Attorney, Agent, or Firm* — JCIPRNET

(57) ABSTRACT

A moving-coil speaker includes a frame, magnetic circuit system setting section, and magnetic circuit system. The frame has a first surface. The magnetic circuit system setting section is formed on the first surface and includes a first region and a second region surrounding the first region. The magnetic circuit system is disposed at the magnetic circuit system setting section and includes at least one voice coil which spaced from the first surface of the frame and having a first end and a second end opposite to the first end. The first end defines a virtual plane extending along a radial direction of the voice coil. The virtual plane and the first surface of the first region define a first distance. The virtual plane and the first surface of the second region define a second distance. The second distance is greater than the first distance, and the second distance and the first distance are parallel.

5 Claims, 4 Drawing Sheets

MOVING COIL SPEAKER WITH ANNULAR RIB

CROSS-REFERENCE TO RELATED APPLICATION

This application claims the priority benefit of Taiwan application serial no. 111125805, filed on Jul. 8, 2022. The entirety of the above-mentioned patent application is hereby incorporated by reference herein and made a part of this specification.

BACKGROUND

Technology Field

The disclosure relates to a speaker, and particularly, to a moving-coil speaker.

Description of Related Art

Moving-coil speakers are a common type of speakers on the market. The movement of the voice coil under the action of the electromagnetic force causes the diaphragm to vibrate, thereby producing sound. Generally, components, such as voice coils, magnets, and circuit boards of a moving-coil speaker are disposed within the internal frame structure. However, with the conventional frame structure design, the overall structure of the moving-coil speaker is thicker and heavier, not contributing to the lightness and thinness of the product, and provides less space for the voice coil to vibrate, which virtually limits the vibration stroke of the voice coil.

SUMMARY

The disclosure provides a moving-coil speaker, with which its overall structural thickness may be reduced, its weight and manufacturing cost may be reduced, and space for the stroke of the voice coil may be increased.

A moving-coil speaker of the disclosure includes a frame, a magnetic circuit system setting section, and a magnetic circuit system. The frame includes a first surface. The magnetic circuit system setting section is formed on the first surface of the frame. The magnetic circuit system setting section includes a first region and a second region, and the second region surrounds the first region. The magnetic circuit system is disposed at the magnetic circuit system setting section and includes a voice coil. The voice coil is spaced apart from the first surface of the frame. The voice coil has a first end and a second end opposite to the first end, the first end of the voice coil defines a virtual plane. The virtual plane extends along a radial direction of the voice coil. The virtual plane and the first surface of the first region defines a first distance. The virtual plane and the first surface of the second region defines a second distance. The second distance is greater than the first distance, and the second distance and the first distance are parallel.

In an embodiment of the disclosure, the frame includes a second surface opposite to the first surface, the frame includes a groove on the second surface, and the groove is disposed in alignment with the first region.

In an embodiment of the disclosure, the moving-coil speaker further includes a circuit board. The circuit board is disposed on the second surface and in the groove and electrically connected to the voice coil.

In an embodiment of the disclosure, the moving-coil speaker further includes a circuit board. The circuit board is disposed on the second surface and outside the groove and electrically connected to the voice coil.

In an embodiment of the disclosure, the frame includes an annular protruding rib on the second surface, the annular protruding rib defines the groove, and the annular protruding rib is disposed in alignment with the second region.

In an embodiment of the disclosure, the frame includes two protruding ribs on the second surface, and the two protruding ribs are opposite to each other and disposed outside the annular protruding rib.

In an embodiment of the disclosure, the voice coil defines a first axial direction corresponding to the annular protruding rib, and a distance between an inner edge of the annular protruding rib and the first axial direction is less than a distance between an outer edge of the annular protruding rib and the first axial direction.

In an embodiment of the disclosure, the magnetic circuit system further includes a magnet, the magnet is disposed on the first surface and in alignment with the first region, and an inner edge of the annular protruding rib is overlapped with an outer edge of the magnet in a direction parallel to the first axial direction.

In summary, in the moving-coil speaker of the disclosure, the distance between the virtual plane and the first surface of the second region is greater than the distance between the virtual plane and the first surface of the first region. Accordingly, the overall structural thickness, the weight, and the manufacturing cost are reduced, and the space for the stroke of the voice coil can be further increased as well.

DESCRIPTION OF THE EMBODIMENTS

Figure 1:
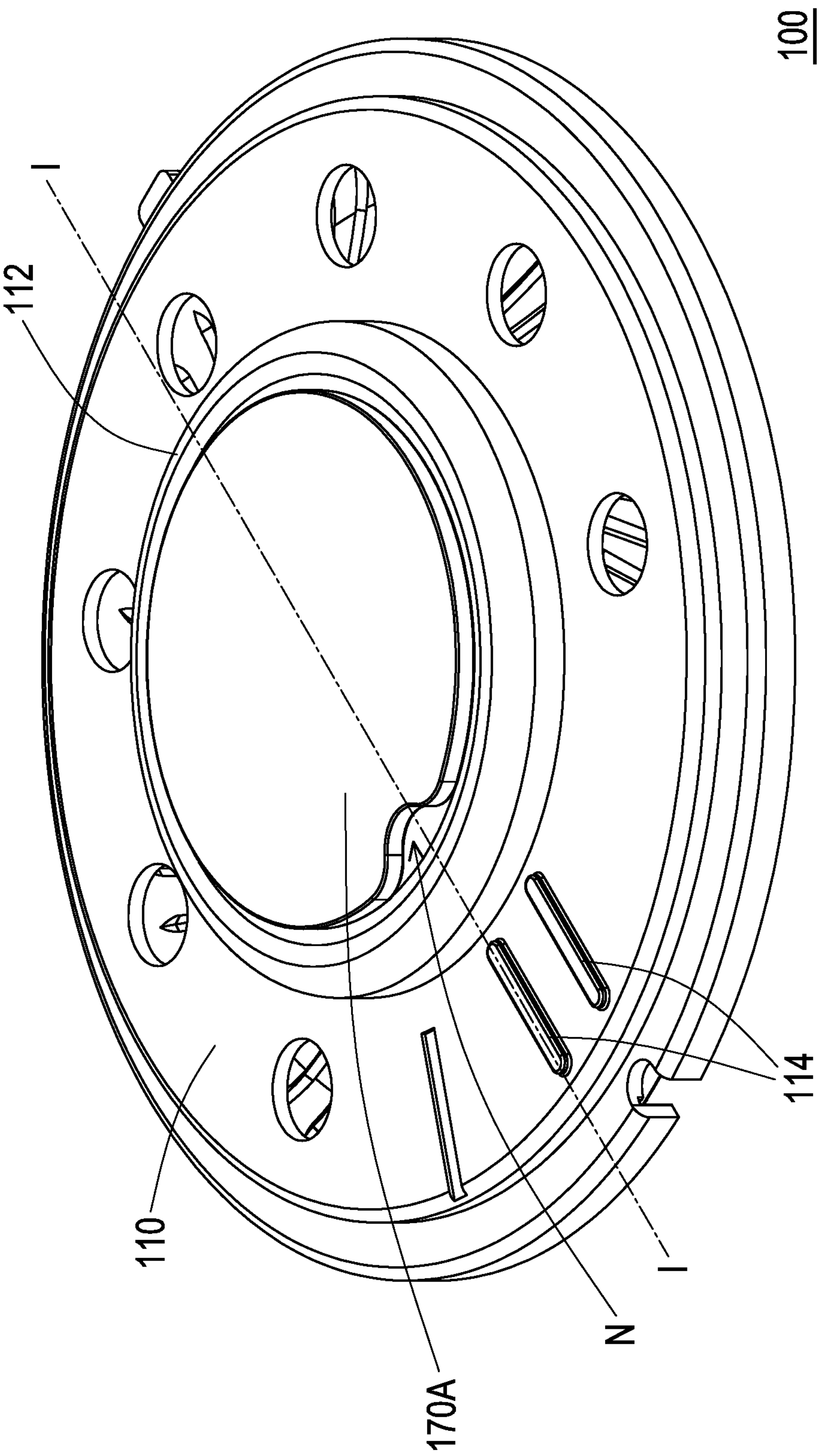
FIG. 1 is a perspective view of a moving-coil speaker according to an embodiment of the disclosure.
Figure 2:
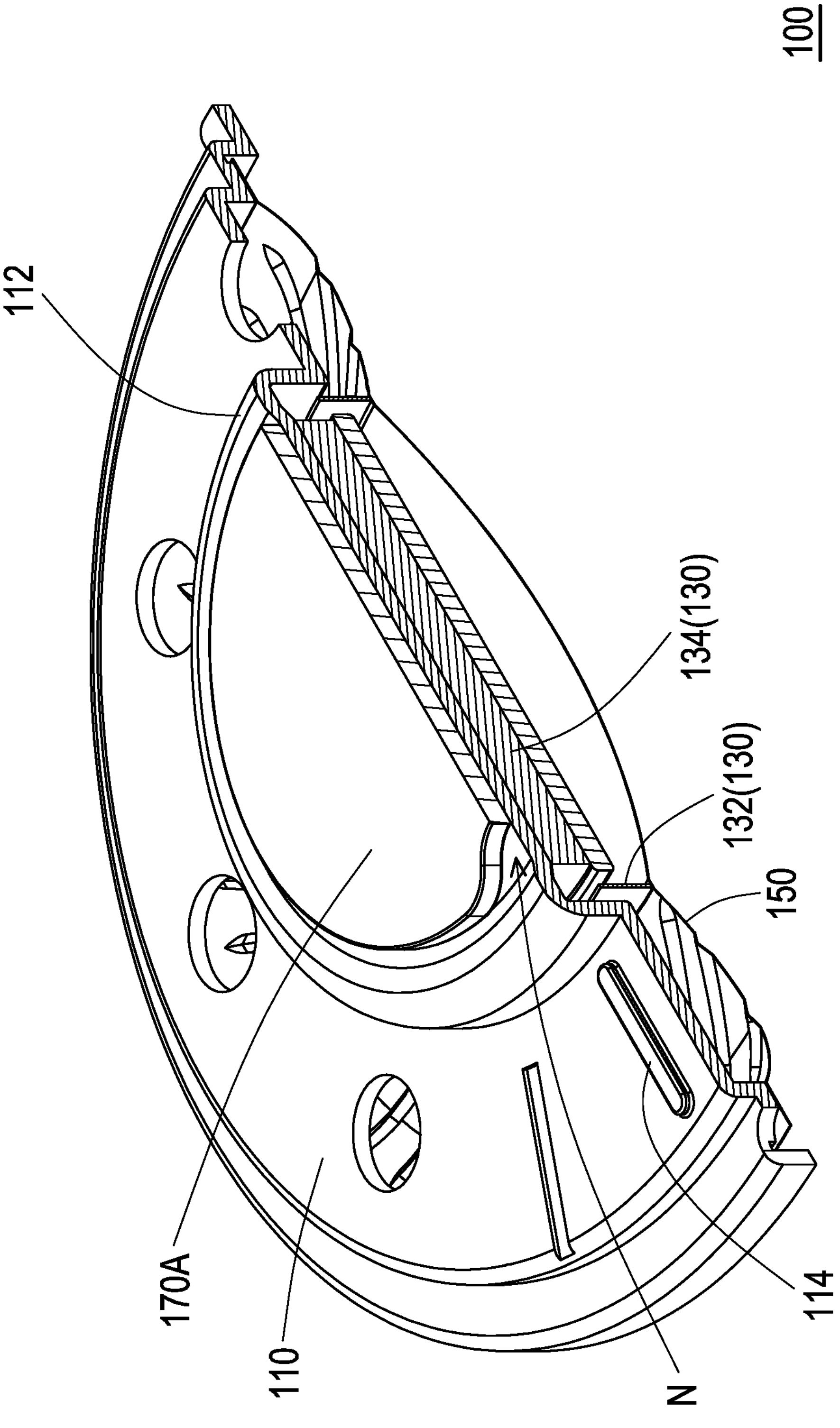
FIG. 2 is a perspective cross-sectional view of the moving-coil speaker of FIG. 1 along line I-I.
Figure 3:
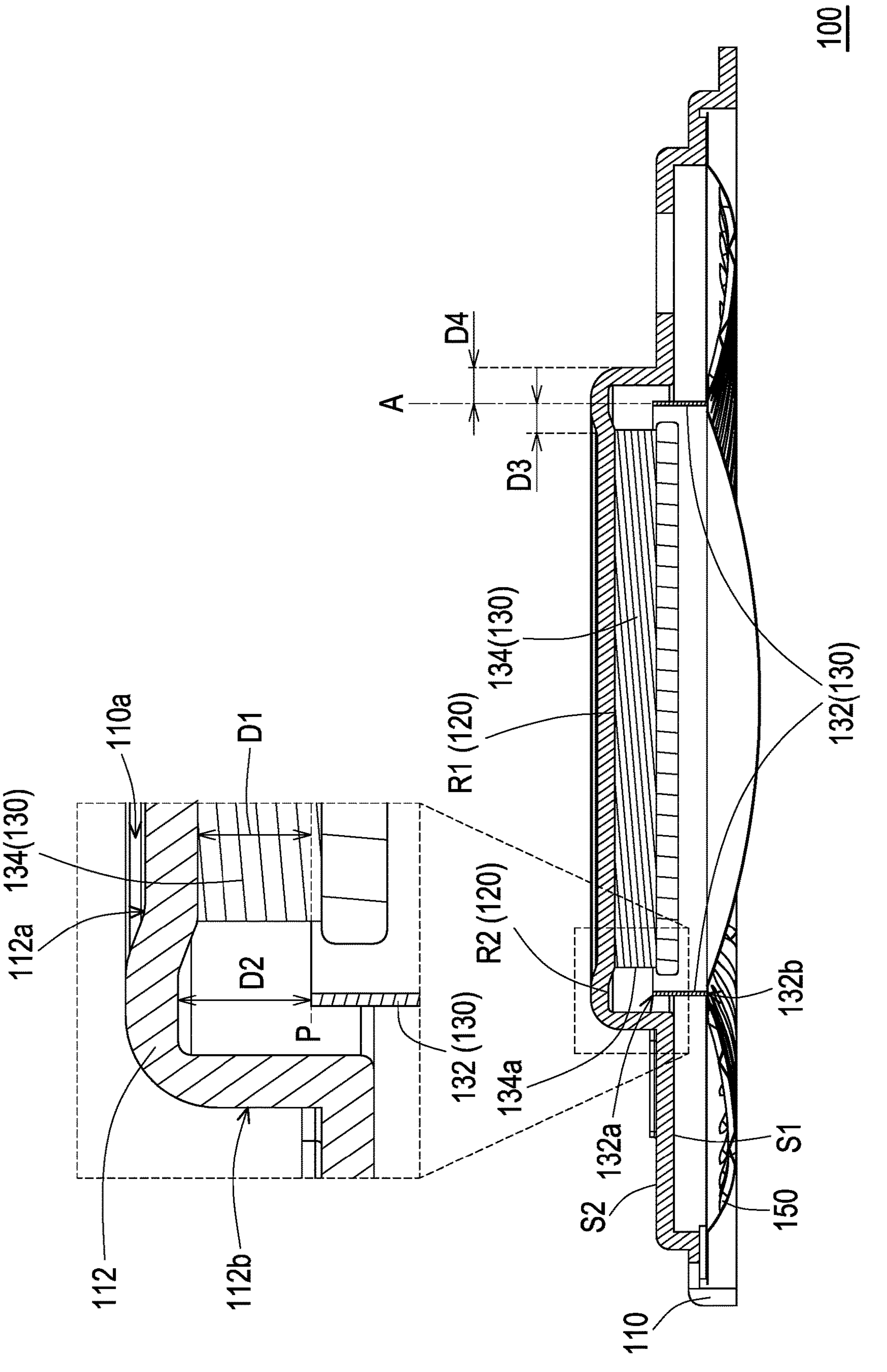
FIG. 3 is a cross-sectional view of the moving-coil speaker of FIG. 1 along line I-I.

FIG. 1 is a perspective view of a moving-coil speaker according to an embodiment of the disclosure. FIG. 2 is a perspective cross-sectional view of the moving-coil speaker of FIG. 1 along line I-I. FIG. 3 is a cross-sectional view of the moving-coil speaker of FIG. 1 along line I-I. To clearly illustrate the structure of the moving-coil speaker, the circuit board of the moving-coil speaker is hidden in FIG. 3. Referring to FIG. 1 to FIG. 3, a moving-coil speaker 100 of the embodiment includes a frame 110, a magnetic circuit system setting section 120, and a magnetic circuit system 130. The moving-coil speaker 100 of the embodiment can be applied to earphones, but the application fields and devices are not limited thereto. The frame 110 has a first surface S1 and a second surface S2 opposite to the first surface S1. The first surface S1 is an inner surface of the frame 110, and the second surface S2 is an outer surface of the frame 110. The magnetic circuit system setting section 120 is formed on the first surface S1 of the frame 110 and includes a first region R1 and a second region R2, and the second region R2 surrounds the first region R1. The magnetic circuit system 130 is disposed in the magnetic circuit system setting section 120 and includes a voice coil 132. The voice coil 132 is spaced apart from the first surface S1 and disposed in alignment with the second region R2.

The moving-coil speaker 100 of the embodiment further includes a diaphragm 150 and a circuit board 170A. The diaphragm 150 is connected to the frame 110 and the voice coil 132 and disposed at the bottom of the moving-coil speaker 100 (i.e., the lower part of FIG. 1). The circuit board 170A is disposed on the second surface S2 of the frame 110 and electrically connected to the voice coil 132. The magnetic circuit system 130 further includes a magnet 134. The magnet 134 is disposed on the first surface S1, in alignment with the first region R1, and disposed between the diaphragm 150 and the first surface S1. The projection area of the magnet 134 on the first surface S1 is surrounded by the projection area of the voice coil 132 on the first surface S1. When the current of the circuit board 170A is transmitted to the voice coil 132, the voice coil 132 generates an electromagnetic field according to the frequency of the current and interacts with the magnetic field of the magnet 134 to move the voice coil 132, so the diaphragm 150 connected to the voice coil 132 also moves accordingly and drives the air adjacent to the diaphragm 150 to vibrate to produce sound.

Referring to FIG. 3, the voice coil 132 of the embodiment has a first end 132*a* and a second end 132*b* opposite to the first end 132*a*. The first end 132*a* is close to a side of the first surface S1, and the second end 132*b* is located on another side away from the first surface S1 and connected to the diaphragm 150. The first end 132*a* may define a virtual plane P, and the virtual plane P extends along the radial direction of the voice coil 132. The distance between the virtual plane P and the first surface S1 of the first region R1 is a first distance D1, the distance between the virtual plane P and the first surface S1 of the second region R2 is a second distance D2, the second distance D2 is greater than the first distance D1, and the second distance D2 and the first distance D1 are parallel to each other. That is, the distance in the vertical direction between the voice coil 132 and the first surface S1 of the second region R2 is greater than the distance in the vertical direction between the voice coil 132 and the first surface S1 of the first region R1. Accordingly, there is more space between the voice coil 132 and the first surface S1, which can effectively adapt to the long vibration stroke of the voice coil 132 so that the limitation of the voice coil 132 in the design of the vibration stroke is overcome.

Note that the frame 110 of the embodiment has a groove 110*a* on the second surface S2, and the groove 110*a* is in alignment with the first region R1 for the circuit board 170A to be disposed in the groove 110*a*. Accordingly, the thickness of the overall structure is reduced, and the volume of the magnet 134 can be relatively reduced as well. With the design of the frame 110 of the embodiment, the volume of the magnet 134 can be reduced by 27%, the weight of the moving-coil speaker 100 can be effectively reduced, and so does the manufacturing cost.

On the other hand, the frame 110 of the embodiment has an annular protruding rib 112 on the second surface S2. The annular protruding rib 112 defines the groove 110*a* and is disposed in alignment with the second region R2. The voice coil 132 defines a first axial direction A corresponding to the annular protruding rib 112, the distance between an inner edge 112*a* of the annular protruding rib 112 and the first axial direction A is a third distance D3, the distance between an outer edge 112*b* of the annular protruding rib 112 and the first axial direction A is a fourth distance D4, and the third distance D3 is less than the fourth distance D4 so that the voice coil 132 is close to the magnet 134. Specifically, the inner edge 112*a* of the annular protruding rib 112 is overlapped with an outer edge 134*a* of the magnet 134 in a direction parallel to the first axial direction A. As the third distance D3 is smaller, the voice coil 132 is closer to the magnet 134, so that the magnetic field is more concentrated and the sensitivity of the moving-coil speaker 100 to the input signal is improved. With the design of the frame 110 in the embodiment, the sensitivity of the moving-coil speaker 100 can be increased by at least 5%, for example, which contributes to improve the acoustic performance of the moving-coil speaker 100.

In the embodiment, as long as the voice coil 132 is not in contact with the magnet 134 without affecting the vibration function, the size of the third distance D3 can be determined according to design requirements, which is not limited in the disclosure.

In addition, the frame 110 of the embodiment further has two protruding ribs 114 on the second surface S2 (FIG. 1). The two protruding ribs 114 are opposite to each other and disposed outside the annular protruding rib 112 and correspond to a notch N (FIG. 1) of the circuit board 170A, so that the circuit board 170A can be electrically connected to the magnetic circuit system 130. Specifically, the notch N of the circuit board 170A can be connected to one end of an enameled wire (not shown). The enameled wire extends downward along the annular protruding rib 112, is fixed to the area between the two protruding ribs 114 with glue, and finally extends into the frame 110 to be electrically connected to the magnetic circuit system 130. With the configuration of the protruding ribs 114, the glue coating range is limited, materials are saved, and the enameled wire is protected from being damaged by external force as well.

Figure 4:
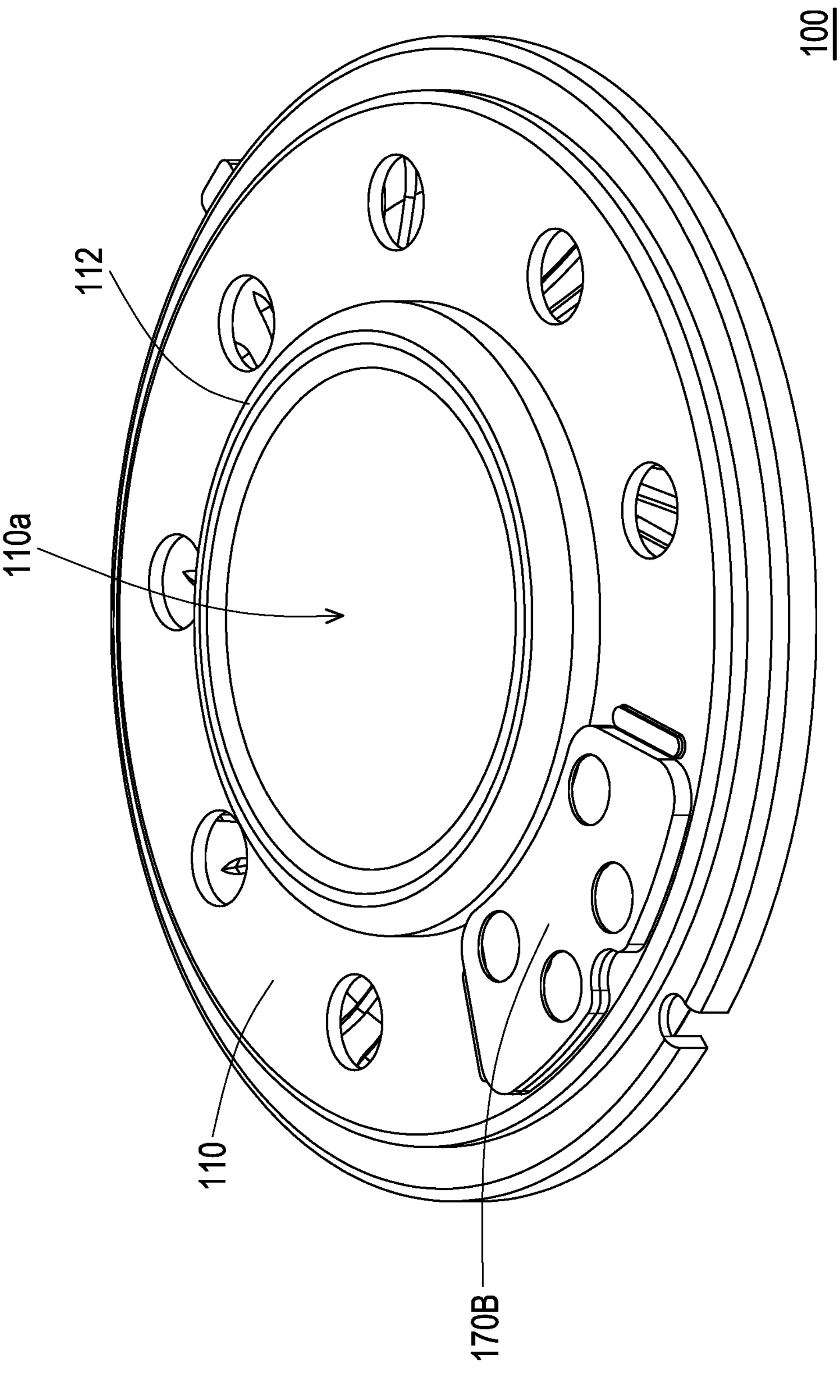
FIG. 4 is a perspective view of a moving-coil speaker according to another embodiment of the disclosure.

FIG. 4 is a perspective view of a moving-coil speaker according to another embodiment of the disclosure. The difference between the embodiment shown in FIG. 4 and the embodiment shown in FIG. 1 is that the circuit board 170A of FIG. 1 is disposed in the groove 110*a* of the second surface S2 of the frame 110, while a circuit board 170B of FIG. 4 is disposed outside the groove 110*a* of the second surface S2 of the frame 110. That is, the circuit board of the disclosure can be disposed either inside or outside the groove 110*a* of the second surface S2 according to design requirements, which is quite flexible and convenient.

In summary, in the moving-coil speaker of the disclosure, the distance between the virtual plane and the first surface of the second region is greater than the distance between the virtual plane and the first surface of the first region, which not only reduces the overall structural thickness, the volume of the magnet, the weight, and the manufacturing cost but also increases the space for the stroke of the voice coil, which is suitable for long vibration stroke of the voice coil. In addition, the configuration of the voice coil close to the magnet contributes to the concentration of the magnetic field and the implementation of improving the product sensitivity.

Although the moving-coil speaker of the disclosure has been disclosed with reference to the foregoing embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the foregoing detailed descriptions.

What is claimed is:

1. A moving-coil speaker, comprising:

a frame comprising a first surface and a second surface opposite to the first surface;

a magnetic circuit system setting section formed on the first surface of the frame, wherein the magnetic circuit system setting section comprises a first region and a second region, and the second region surrounding the first region;

a magnetic circuit system disposed at the magnetic circuit system setting section and comprising at least a voice coil, wherein the voice coil is spaced apart from the first surface of the frame, the voice coil has a first end and a second end opposite to the first end, the first end of the voice coil defines a virtual plane, the virtual plane extends along a radial direction of the voice coil, the virtual plane and the first surface of the first region defines a first distance, the virtual plane and the first surface of the second region defines a second distance, the second distance is greater than the first distance, and the second distance and the first distance are parallel; and a circuit board disposed on the second surface of the frame, wherein the circuit board having a notch and electrically connected to the voice coil through a wire that is connected to the notch and extends along the second surface into the frame, wherein the frame further comprises a groove on the second surface, the groove is disposed in alignment with the first region, and the circuit board is disposed in the groove.

2. The moving-coil speaker of claim 1, wherein the frame comprises an annular protruding rib on the second surface, the annular protruding rib defines the groove, and the annular protruding rib is disposed in alignment with the second region.

3. The moving-coil speaker of claim 2, wherein the frame comprises two protruding ribs on the second surface, and the two protruding ribs are opposite to each other and disposed outside the annular protruding rib.

4. The moving-coil speaker of claim 3, wherein the magnetic circuit system further comprises a magnet, the magnet is disposed on the first surface and in alignment with the first region, and an inner edge of the annular protruding rib is overlapped with an outer edge of the magnet in a direction parallel to the first axial direction.

5. The moving-coil speaker of claim 2, the voice coil defines a first axial direction corresponding to the annular protruding rib, and a distance between an inner edge of the annular protruding rib and the first axial direction is less than a distance between an outer edge of the annular protruding rib and the first axial direction.

* * * * *